United States Patent
Rossanese et al.

(10) Patent No.: US 7,462,316 B2
(45) Date of Patent: Dec. 9, 2008

(54) APPARATUS AND A METHOD FOR THE INJECTION-COMPRESSION MOULDING OF ARTICLES MADE OF PLASTIC MATERIAL WITH TWO COMPONENTS

(75) Inventors: Afro Rossanese, Noventa di Piave (IT); Maurizio Bazzo, Oderzo (IT)

(73) Assignee: Inglass S.p.A., San Polo di Piave (Treviso) (IT)

( * ) Notice: Subject to any disclaimer, the term of this patent is extended or adjusted under 35 U.S.C. 154(b) by 731 days.

(21) Appl. No.: 11/047,480

(22) Filed: Jan. 31, 2005

(65) Prior Publication Data
US 2006/0082030 A1    Apr. 20, 2006

(30) Foreign Application Priority Data
Oct. 11, 2004 (IT) .......................... TO2004A0696

(51) Int. Cl.
*B29C 45/64* (2006.01)
*B29C 45/16* (2006.01)
(52) U.S. Cl. ................. 264/259; 264/297.2; 264/328.1; 425/130; 425/555; 425/576
(58) Field of Classification Search .............. 264/328.1, 264/328.7, 328.8, 255, 259, 319, 297.2, 297.8; 425/555, 135, 130, 134, 576, 588, 595
See application file for complete search history.

(56) References Cited

U.S. PATENT DOCUMENTS

| 4,519,763 A | * | 5/1985 | Matsuda et al. | ......... 425/192 R |
| 4,569,807 A | * | 2/1986 | Boudet | ....................... 264/2.2 |
| 4,874,654 A | * | 10/1989 | Funaki et al. | ................ 428/192 |
| 5,093,049 A | * | 3/1992 | Uehara et al. | ................. 264/2.2 |
| 5,196,150 A | * | 3/1993 | Mimura et al. | ............. 264/40.5 |

FOREIGN PATENT DOCUMENTS

| DE | 10217584 | * 11/2002 |
| JP | 5-329898 | * 12/1993 |

OTHER PUBLICATIONS
U.S. Appl. No. 11/047,500, filed Jan. 31, 2005, Rossanese et al.
(Continued)

*Primary Examiner*—Jill L Heitbrink
(74) *Attorney, Agent, or Firm*—Heslin Rothenberg Farley & Mesiti P.C.; Victor A. Cardona, Esq.

(57) ABSTRACT

Described herein is injection-compression moulding of articles made of plastic material with two components by means of a press of the stack-mould type, in which the first and second countermoulds are constrained to the corresponding moulds carried by the rotating central element of the press so as to enable the respective cavities to set themselves in a position of partial opening for the injection of the plastic material within them. To both of the cavities there is then applied a closing force to bring about compression of the plastic material injected therein.

12 Claims, 7 Drawing Sheets

OTHER PUBLICATIONS

U.S. Appl. No. 11/047,498, filed Jan. 31, 2005, Rossanese et al.
U.S. Appl. No. 11/047,483, filed Jan. 31, 2005, Rossanese et al.
U.S. Appl. No. 11/047,106, filed Jan. 31, 2005, Rossanese et al.
U.S. Appl. No. 11/047,104, filed Jan. 31, 2005, Rossanese et al.
U.S. Appl. No. 11/047,481, filed Jan. 31, 2005, Rossanese et al.
U.S. Appl. No. 11/046,937, filed Jan. 31, 2005, Rossanese et al.

* cited by examiner

APPARATUS AND A METHOD FOR THE INJECTION-COMPRESSION MOULDING OF ARTICLES MADE OF PLASTIC MATERIAL WITH TWO COMPONENTS

CROSS-REFERENCE TO RELATED APPLICATIONS

This application claims priority from Italian application number TO2004A000696, filed on Oct. 11, 2004, the entire disclosure of which is incorporated herein by reference.

This application also relates to U.S. patent application Ser. No. 11/047,500, filed Jan. 31, 2005, and titled "A PROCESS FOR THE PRODUCTION OF PLATES MADE OF TRANSPARENT PLASTIC MATERIAL WITH NON-TRANSPARENT AREAS," the contents of which are incorporated herein by reference.

This application also relates to U.S. patent application Ser. No. 11/047,498, filed Jan. 31, 2005, and titled "A PROCESS FOR THE PRODUCTION OF PLATES MADE OF TRANSPARENT PLASTIC MATERIAL WITH NON-TRANSPARENT OVERINJECTED PARTS," the contents of which are incorporated herein by reference.

This application also relates to U.S. patent application Ser. No. 11/047,483, filed Jan. 31, 2005, and titled "A METHOD AND AN APPARATUS FOR THE PRODUCTION OF ARTICLES MADE OF MOULDED PLASTIC MATERIAL PARTICULARLY BY MEANS OF INJECTO-COMPRESSION," the contents of which are incorporated herein by reference.

This application also relates to U.S. patent application Ser. No. 11/047,106, filed Jan. 31, 2005, and titled "AN APPARATUS AND A METHOD FOR INJECTO-COMPRESSION MOULDING OF ARTICLES MADE OF PLASTIC MATERIAL WITH TWO COMPONENTS," the contents of which are incorporated herein by reference.

This application also relates to U.S. patent application Ser. No. 11/047,104, filed Jan. 31, 2005, and titled "A PROCESS FOR THE PRODUCTION OF PLATES MADE OF PLASTIC MATERIAL WITH PARTS OVERMOULDED BY INJECTO-COMPRESSION," the contents of which are incorporated herein by reference.

This application also relates to U.S. patent application Ser. No. 11/046,481, filed Jan. 31, 2005, and titled "A METHOD FOR THE PRODUCTION OF PLATES MADE OF PLASTIC MATERIAL WITH PARTS OVERMOULDED BY INJECTO-COMPRESSION," the contents of which are incorporated herein by reference.

This application also relates to U.S. patent application Ser. No. 11/046,937, filed on the same day as the present patent application, and titled "AN APPARATUS AND A PROCESS FOR THE INJECTION-COMPRESSION MOULDING OF ARTICLES MADE OF PLASTIC MATERIAL WITH TWO COMPONENTS," the contents of which are incorporated herein by reference.

FIELD OF THE INVENTION

The present invention relates to apparatuses for the moulding of articles made of moulded plastic material with two components, in two successive steps.

More in particular, the invention relates to an apparatus which can be associated to a press of the type comprising: a rotating central element, which bears a first mould and a second mould set opposite to one another; a first countermould and a second countermould, which are set on opposite sides with respect to the rotating central element and can be translated with respect thereto; means for closing said first and second countermoulds with respect to said first and second moulds to define definitively a first cavity and a second cavity; and means for injection of a plastic material within said first and second cavities.

STATE OF THE PRIOR ART

Moulding presses of the sort described above are conventionally called "stack-mould presses" and are used for the moulding of items with two components, including complex ones, in two successive steps: first, the first component is moulded using the first mould and the first countermould; then by means of a rotation through 180° of the rotating central element the first mould is located in a position corresponding to the second countermould for the moulding of the second component on the first component. Simultaneously, via the second mould and the first countermould the first component of a subsequent article is formed, and the cycle is then repeated in an identical way.

FIGS. 1 and 2 of the annexed plate of drawings are schematic representations of an example of a bi-component article obtained with a press of the stack-mould type. The first component, formed with a first plastic material, is designated by 13 and consists, for example, of a transparent plate such as for instance a window panel for the automotive field or a screen for plasma televisions, and the second component is designated by 14 and consists, for example, of a perimetral frame made of a different plastic material, formed with projecting appendages for attachment 15.

FIG. 3 is a schematic illustration, in side elevation, of a press of the stack-mould type that constitutes the starting point of the present invention. It comprises, in brief, a pair of press surfaces 1, 2, to which there are associated respective screw-type injection assemblies 7, 8, which are set on opposite sides with respect to a central element 4 rotating about a vertical axis 6. The press surfaces 1, 2 bear, via respective plates 3 and 5, two countermoulds 9, 12 facing respective moulds 10, 11, carried by the rotating central element 4. The press is equipped with a single closing system (not illustrated in so far as it is of a conventional kind), through which the press surfaces 1, 2 and hence the plates 3, 5 with the countermoulds 9, 12 are closed on opposite sides against the rotating central element 4 so as to define two moulding cavities, within which, via the assemblies 7 and 8, the plastic material is injected in the fluid state. In this way, in the cavity defined between the countermould 9 and the mould 10 there is, for example, formed the first component 13 of the article represented in FIGS. 1 and 2, whilst in the cavity defined between the countermould 12 and the mould 11 the second component 14 is moulded on the first component 13 previously formed. Transfer of the first component 13 from the position corresponding to the countermould 9 towards the position corresponding to the countermould 12 is obtained, as already explained, as a result of the rotation through 180° of the central element 4 about the axis 6. The final piece formed by the two components 13 and 14 is finally unloaded from the press.

A stack-mould press of this type is described, for example, in the document No. DE-A-10217584.

This system thus enables management of the simultaneous injection of the two components that are to constitute the finished article with the same closing system. In the case of items of relatively large dimensions, the forces of closing required are generally smaller than the ones required in the case of traditional multicomponent presses equipped with rotating plates, which are consequently bound to be abandoned for such production processes.

Precisely in the case of pieces of large dimensions there exists, however, the problem of guaranteeing the necessary quality of the moulded items in terms of absence of deformations or warping and maintenance of the best mechanical characteristics. For this reason, there has been proposed, precisely for the purpose of improving the characteristics of the items produced, a technique of injection-compression consisting in the performance of a step of compression following upon the step of injection of the plastic material within the mould. This technique, generally described, for example, in the already cited document No. DE-A-10217584 as well as in the document No. WO-02/32647, enables a considerable reduction of the residual stresses in the material injected within the cavity of the mould.

However, the method of injection-compression has not up to the present day, to the knowledge of the present applicant, been applied to the presses of the stack-mould type described previously, for forming articles with two components with simultaneous double injection-compression. In effect, this is not in practice possible with normal presses. There is thus performed the injection-compression for just one step, normally for the moulding of the first component of larger dimensions of the article, and there is then carried out the injection of the second component of smaller dimensions with the mould closed, subsequent to the step of compression of the first component. This methodology can be implemented, for example, by the press of the stack-mould type described in the already cited document No. DE-A-10217584.

By injecting the material of the second component in a traditional way and with a delay, the results, in terms of reduction of the residual stresses, obtained by carrying out the injecto-compression of the first component are drastically impaired. In practice, the compression is carried out using the controls of the closing force available on modern presses, and said closing force can vary according to the amount of material injected and in time so as to close the mould only after the amount of material necessary for filling thereof has been injected.

Since in presses of the stack-mould type there is provided a single closing system, the injection-compression, as has been said, is carried out in a single step, i.e., normally following upon injection of the first component, or else is not carried out at all. In the first case, the injection of the second component is delayed and carried out only at the end of injection-compression of the first component, with the consequent negative effects in terms of cycle time as well as, as has been said, on the residual stresses induced in the second component.

On the other hand, not even with the use of presses with rotating plate does the method of injection-compression enable satisfactory results to be obtained, in so far as the openings and the speed of compression for the two steps of forming of the two components are equal, which jeopardizes the final result.

SUMMARY OF THE INVENTION

The purpose of the present invention is to solve the technical problem defined above, and more in particular to enable execution of simultaneous injection-compression simultaneously in the two steps of forming of articles made of plastic material with two components using a press of the stack-mould type.

The above purpose is achieved, according to the invention, thanks to the fact that the apparatus includes retention means associated to at least one of said first and second cavities for constraining to said central element the corresponding countermould for a pre-set stroke of opening of said at least one cavity prior to injection of the plastic material within said first and second cavities.

In the case, which is normally more frequent, where the first and second cavities define different thrust surfaces of the injected plastic material within them, the aforesaid retention means can be operatively associated only to the cavity with larger thrust surface.

As an alternative, said means of retention can be operatively associated to both of the cavities.

The aforesaid opening stroke can be regulated and possibly can be differentiated for said first and second cavities.

Thanks to this idea of solution, the apparatus according to the invention is able to perform the simultaneous injection-compression simultaneously, albeit with possible pre-set delays, on the plastic materials injected in the two cavities, with a sensible improvement of the mechanical characteristics of the articles with two components produced by the press, this being both in the case of simultaneous injection-compression, i.e., with injection during compression, and in the case of sequential injection-compression, i.e., with compression at the end of injection.

The definition of the moulding parameters on the two steps may prove in general more complex with respect to the case where the injection-compression is performed on a single step. However, thanks to the invention, evident advantages can be achieved as regards reduced cycle times, maintenance in temperature of the first moulded component, in addition of course, to the advantage of being able to apply the injection-compression also on the second component.

Also a subject of the present invention is a method for the moulding by means of injection-compression of both of the components of a bi-component article by means of a press of the stack-mould type.

DETAILED DESCRIPTION OF THE INVENTION

Figure 1:
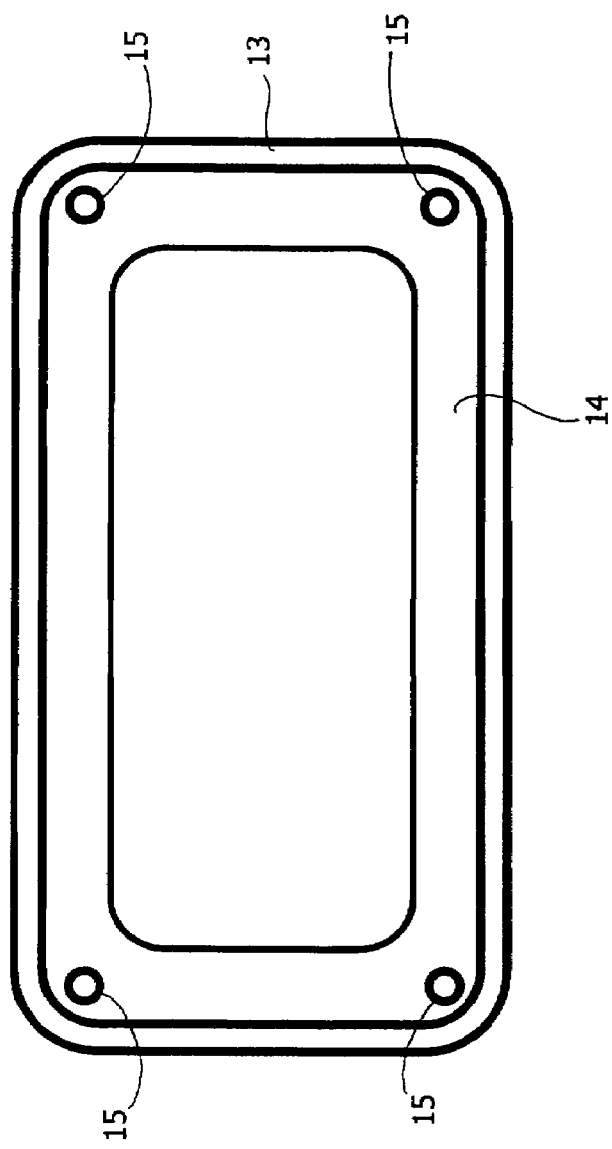
FIG. 1 is a schematic dorsal elevation of a bi-component article which may be obtained with the apparatus according to the invention.
Figure 2:
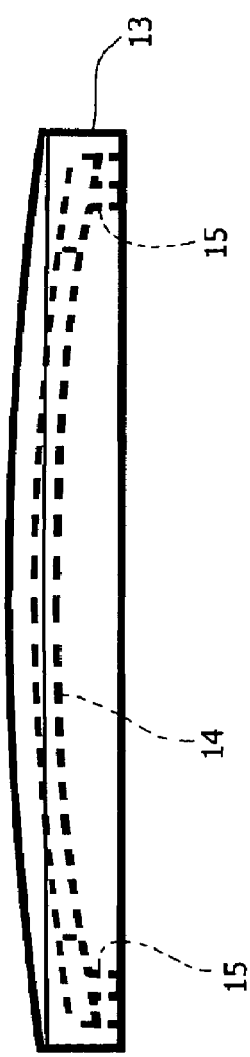
FIG. 2 is a partially sectioned view in side elevation of FIG. 1.

In synthesis, the moulding apparatus according to the invention, as already explained, enables injection-compression to be carried out in substantial simultaneity of the two plastic materials injected within the cavities of the two moulds for the formation, respectively, of the first component and of the second component (for example the ones designated by the reference numbers 13 and 14 in FIGS. 1 and 2), described previously, of a bi-component article. As will be seen in detail in what follows, this is rendered possible, according to the peculiar characteristic of the invention, thanks to the use of particular devices (hooks) capable of blocking opening of the countermoulds with respect to the moulds by a desired amount. The optimal distance of opening of the surfaces of the press during the injection of the first and second components is obviously a function of the final desired thickness of the piece and can be different between the first step (first component) and the second step (second component), just as the amounts of material injected and the injection times may differ.

The type of hooks for obtaining blocking at the desired distance and the type of actuation of said hooks may be constructionally very different with respect to the structure of the moulds. In any case, the provision of these hooks enables injection of the materials of the two components in substantial simultaneity in the cavities of the two moulds, which will thus maintain the desired opening during the injection step. The surfaces of the press will hence be open for a distance equal to the sum of the desired openings for each step. Next, after a more or less long delay, the system for closing the press will perform the step of compression of the materials injected in the two cavities, also in this case in a substantially simultaneous way.

Figure 3:
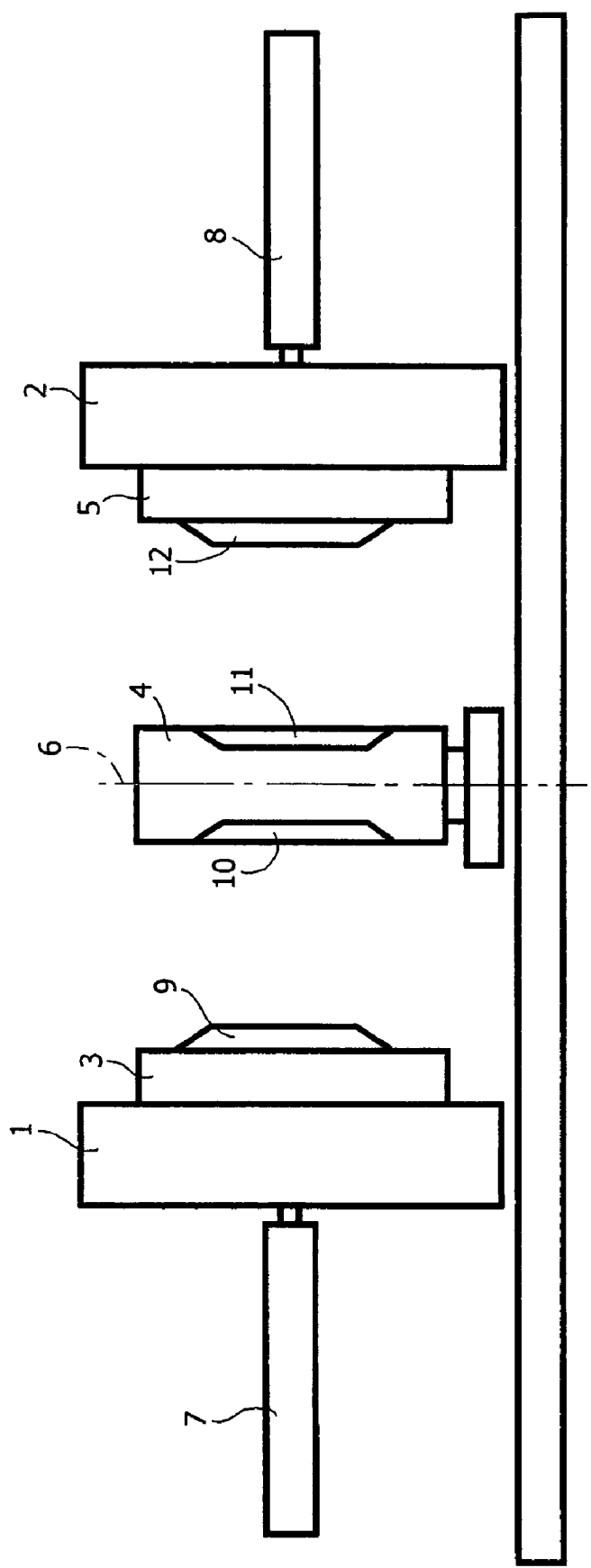
FIG. 3 is a schematic and simplified view in elevation of a press of the stack-mould type according to the prior art.
Figure 4:
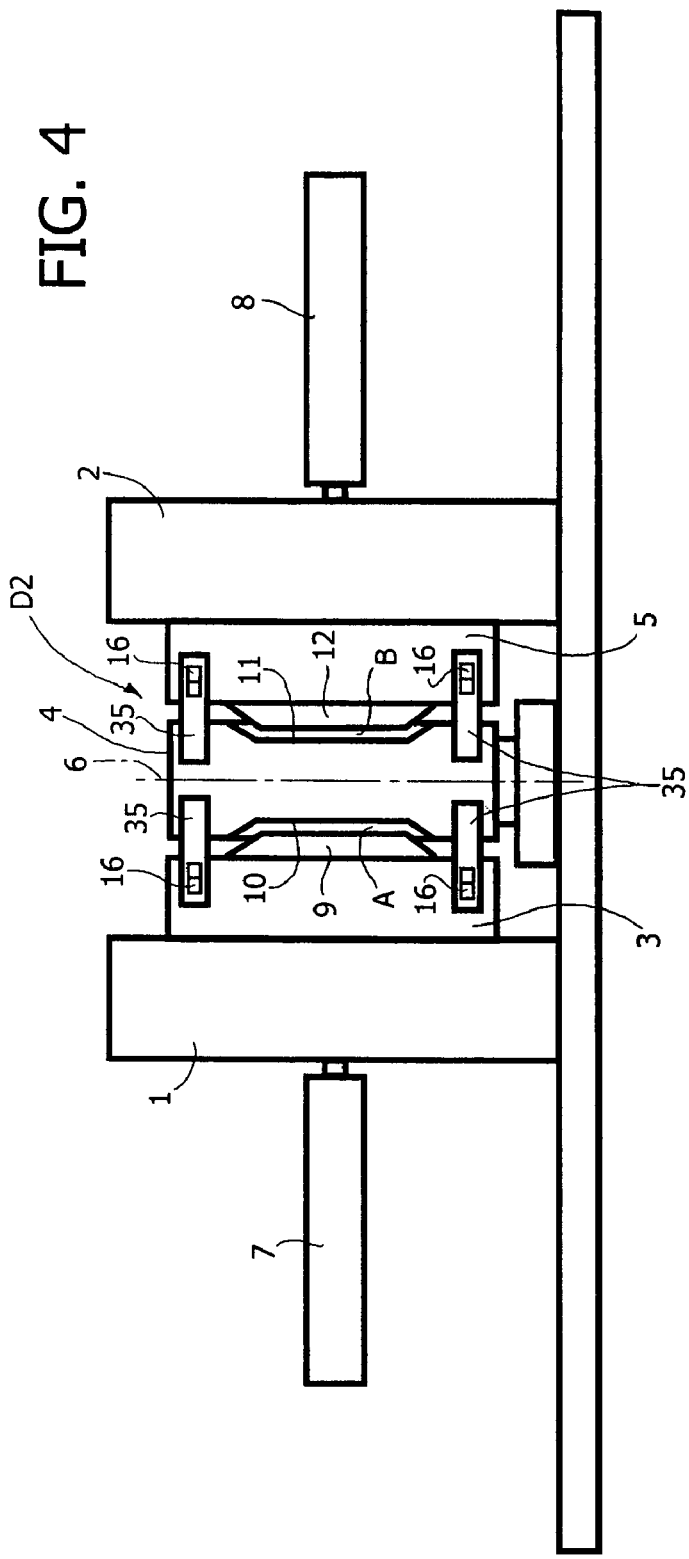
FIG. 4 is a view similar to that of FIG. 3 and is a schematic representation of the press according to the invention during the injection step.
Figure 5:
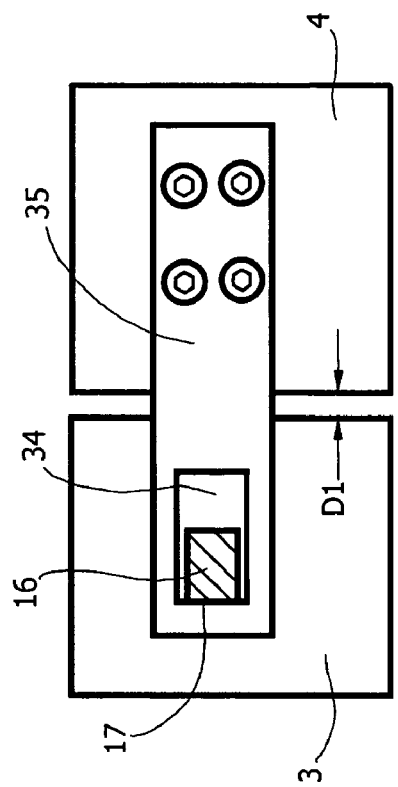
FIG. 5 shows, at an enlarged scale, the detail designated by A in FIG. 4.

FIGS. 4 and 5, in which parts that are identical or similar to the ones already described previously with reference to FIG. 3 are designated by the same reference numbers, illustrate a particularly simple embodiment of the hooks according to the invention that may prove useful for explaining the working principle.

As may be seen in said figures, the plate 3, 5 of each countermould 9, 12 bears, on each side, a series (in the example illustrated two in number) of projecting contrasts 16, each of which is inserted within an elongated opening 34 of a hook-like bar 35, carried by the rotating central element 4. Each contrast 16, constituted, for example, by a simple square pin, is able to slide horizontally within the opening 34 of the respective hook-like bar 35 in such a way as to enable opening of the countermould 9, or of the countermould 12, with respect to the corresponding mould 10 or else 11 by an amount designated, respectively, by D1 (FIG. 5) and D2 (FIG. 4). In a position corresponding to said amounts each contrast 16 bears upon the outer end 17 of the opening 34 of the respective hook 35. The length of said elongated opening 34 will in any case be sufficient to enable free closing of the one and of the other countermould 9, 12.

It should be noted that the amounts D1 and D2 can be regulated, with systems not illustrated in so far as they are within the reach of persons skilled in the branch, and can be different from one another according to the dimensions and more in general the characteristics of the two components of the items to be moulded, which will normally be different.

Figure 6:
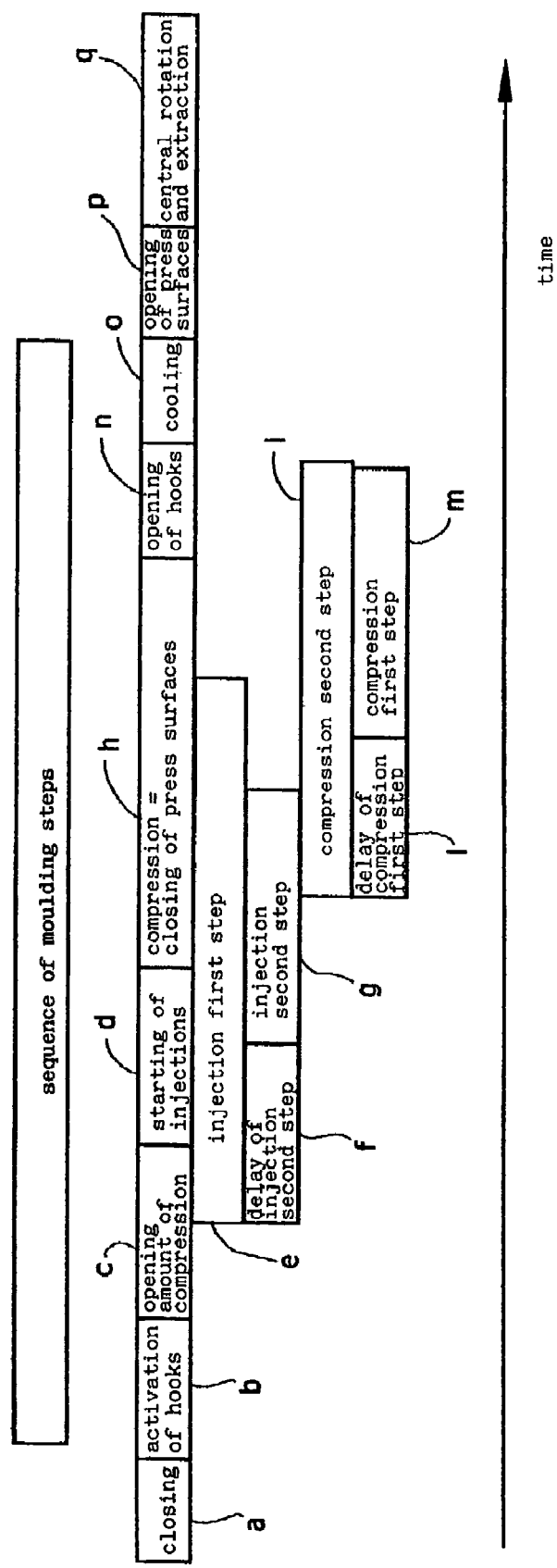
FIG. 6 is a diagram that shows the sequence of the moulding steps by means of double injection-compression obtained using the apparatus according to the invention.

The diagram of FIG. 6 illustrates, purely by way of non-limiting example, a possible sequence of the moulding cycle performed using the apparatus according to the invention by means of double injection-compression. The first step, designated by a, consists in the complete closing of both of the countermoulds 9 and 12 with respect to the respective moulds 10, 11. In the subsequent step b the hooks 35 are activated, in the sense that they will be positioned, starting from a resting condition, in which they enable free opening of the countermoulds 9 and 12, in an operative condition of engagement with the corresponding contrasts 16. This step, which may be obtained with mechanisms not illustrated in so far as they are within the reach of the person skilled in the branch, may of course, be mechanized and automated.

The next step is the partial opening of the countermoulds 9, 12 with respect to the moulds 10, 11 by the amounts D1 and D2 envisaged, defined as clarified previously by the engagement between the contrasts 16 and the ends 17 of the elongated openings 34 of the hooks 35. This step is designated by c in the diagram of FIG. 6.

The next step, designated by d, consists in the start of the injection of the plastic material within the cavities A and B of the two moulds, via the injection screws 7 and 8 with the corresponding hot chambers and the corresponding injectors (not illustrated) associated thereto. The injection may be regulated according to moulding parameters, which are pre-defined and in any case variable, for example, so as to start first the injection of the plastic material of the first component within the cavity A of the mould 10, as designated by e in FIG. 6, and then, after a certain delay f, by injecting the plastic material of the second component within the cavity B of the mould 11, as designated by g.

At the end or in the final step of injection of the two materials, the step of compression h is set under way by approaching the press surfaces 1, 2 to the central element 4 so as to reduce at the same time and progressively the amounts D1 and D2 and hence the volume within the two moulding cavities A, B. At the start of the step of compression, according to the different areas of the cavities A, B, within which the two materials have been injected, and hence according to the consequent different thrust exerted by the materials on the surfaces of the corresponding moulds, it will be found that the material in the cavity with larger surface (for example the cavity A corresponding to the mould 10 and to the countermould 9) will tend to press together the half-moulds of the other cavity B, i.e., typically the mould 11 and the countermould 12 corresponding to the smaller moulding surface. There is thereby obtained a partial compression of the material injected in said cavity B, as designated by i in the diagram of FIG. 6. Then, after a certain delay l, there is performed the compression of the plastic material injected in the other cavity A, as has been said, which corresponds to the first component of the bi-component article. This step of compression is designated by m in the diagram of FIG. 6.

The compression produced initially within the mould with smaller surface constitutes the single particular phenomenon that must be taken into consideration for the definition of the moulding parameters. There must then be considered the effects of the anticipation of the step of compression of one material with respect to the other, by adjusting accordingly the delay times of start of injection to obtain the compression of the two steps at the appropriate moment for the two materials.

The total compression will in any case be regulated by the press as if there were just one injection-compression and will be synchronized with respect to the position of the injection screws 7, 8, i.e., with respect to the amount of material injected.

At the end of the double compression, the next step is to disengage the hooks 35 from the contrasts 16, followed by cooling of the moulded items, opening of the press surfaces 1 and 2, and finally rotation of the central element 4 and extraction of the bi-component item formed in the cavity B of the mould 11. These steps are indicated, respectively, by n, o, p and q in FIG. 6.

The cycle is then repeated in an identical way to form a new first component within the cavity A of the mould 10 and for the completion of the bi-component item in the cavity B of the mould 11.

Even though in the example illustrated the hook-like devices 35 are operatively associated to both of the countermoulds 9 and 10, it should be noted that the use of said hooks in association with the cavity of the mould with bottom thrust surface is not at all necessary. The press surfaces 1 and 2 are in fact normally already controlled to remain open by an amount equal to the sum of the desired openings, and it is thus sufficient for the use of the hooks 35 to be limited to control of opening of the cavity of the mould with larger thrust surface to guarantee in any case correctness of the distance of opening of the other cavity.

It should moreover be pointed out that the steps described with reference to FIG. 6 are widely modifiable and variable according to all the possible solutions of moulding typical of injection-compression, namely, simultaneous injection-compression (with injections performed during compression) and sequential injection-compression (with compression only at the end of the injections), without any problem, with delays of injection and compression of the materials of the two cavities that are also widely variable and modifiable.

What was described previously as regards the working cycle of the apparatus according to the invention with reference to the cycle of double injection-compression presupposes the use of particular solutions such as to cause the two cavities A, B to be always hermetically closed. The purpose of this is to prevent the formation of burrs on the rims of the moulded components, which, among other things, would render impossible moulding of the second component on the first component, which has already been moulded.

Figure 7:
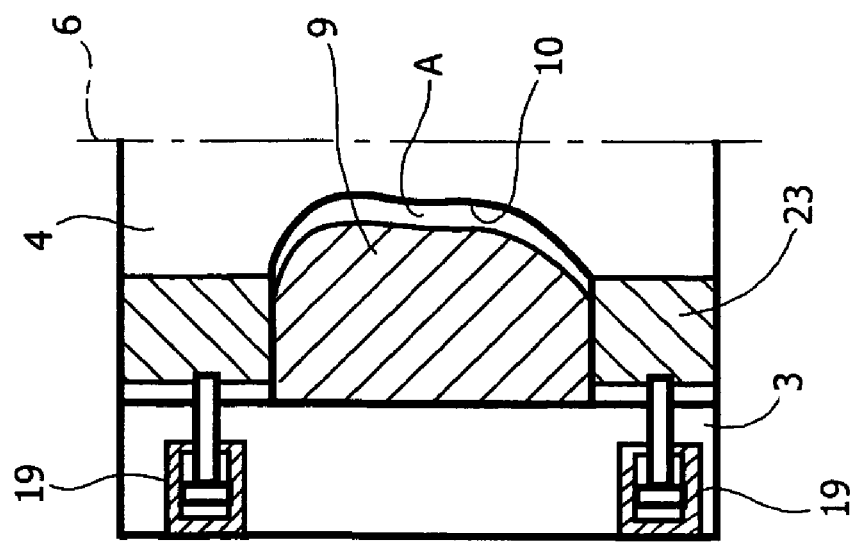
FIG. 7 is a cross-sectional view, at an enlarged scale, of a first embodiment of one of the countermoulds of the apparatus according to the invention.

The above solutions may, for example, be of the type described and illustrated in the already cited document No. WO-02/32647 and exemplified in FIG. 7, and apply in an identical way to both of the moulds 10, 11 and corresponding countermoulds 9, 12. In particular, said solutions are represented by the use of a perimetral frame 18, carried by the plate 3 (or, respectively, 5) on the outside of the countermould 9 (or, respectively, 12). Said perimetral frame 18 is mobile and is pushed into sealed contact towards the central element 4 around the cavity A of the mould 10 (or, respectively, of the cavity B of the mould 11) by means of fluid-controlled jacks 19 or, more simply, by helical compression springs 20. Said frame 18 evidently has the function of guaranteeing, even during the displacements of the countermould 9 (or, respectively, 12), hermetic closing of the cavity A of the mould 10 (or, respectively, of the cavity B of the mould 11) in positions corresponding to the annular surfaces designated by 21 and 22 in FIG. 7.

Furthermore, the thrust of the jacks 19 or of the springs 20 can be regulated and calibrated appropriately, with modalities not described in detail herein in so far as they are within the reach of the person skilled in the branch, so as to compensate and balance out the differences of thrust of the plastic material within the two cavities A and B during the step of compression obtained by the press.

Figure 8:
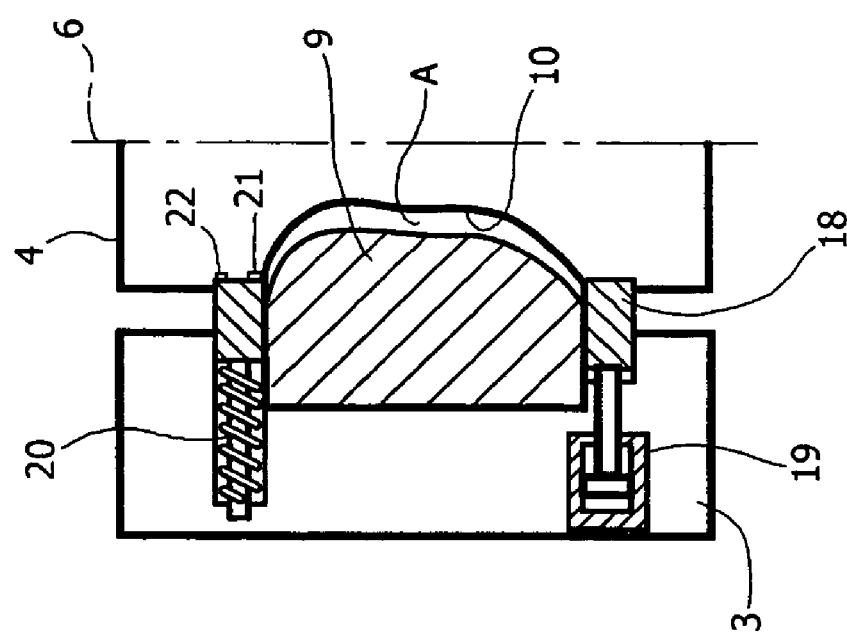
FIG. 8 shows a variant of FIG. 7.

As an alternative, and as illustrated in the variant of FIG. 8, the perimetral frame 18 can be constituted by an annular plate 23, which is mobile within the space comprised between the plate 3 (or, respectively, 5) and the central element 4, around the countermould 9 (or, respectively, 12) and pushed into hermetic-seal contact against the outer edge of the cavity A of the mould 10 (or, respectively, of the cavity B of the mould 11) also in this case, by the action of fluid-controlled jacks 19 or springs 20, which can be conveniently calibrated or regulated for balancing out and compensating the different levels of thrust of the plastic material within the two cavities A and B during the step of compression.

Figure 9:
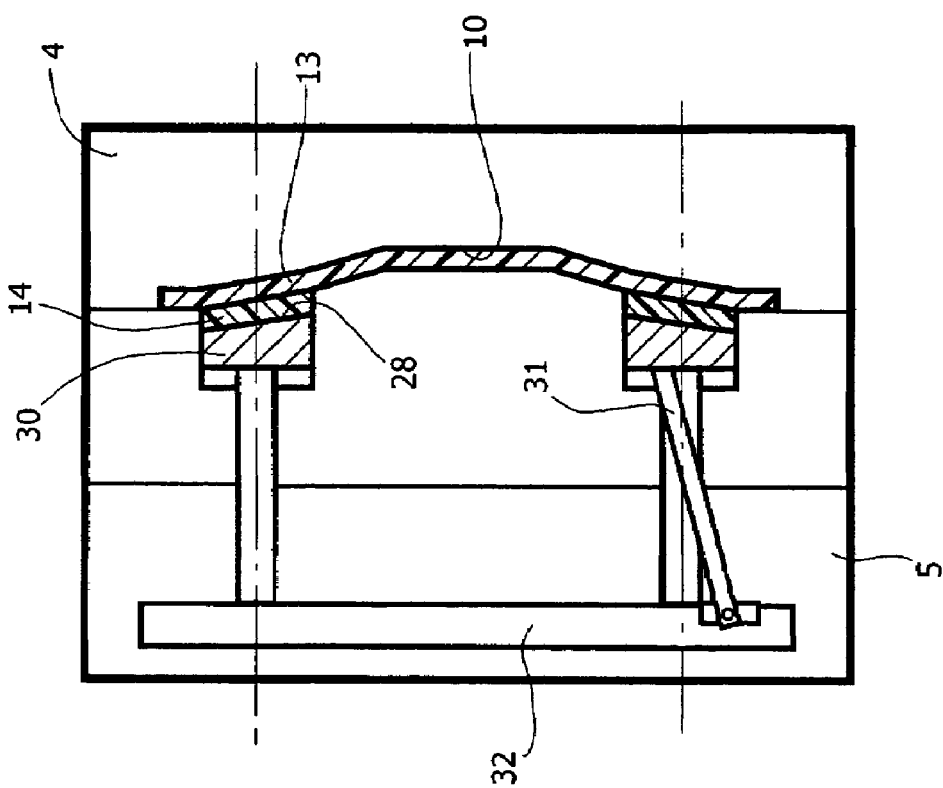
FIG. 9 is a view similar to that of FIG. 7, at an enlarged scale, showing an embodiment of the other countermould of the apparatus according to the invention in a first step.
Figure 10:
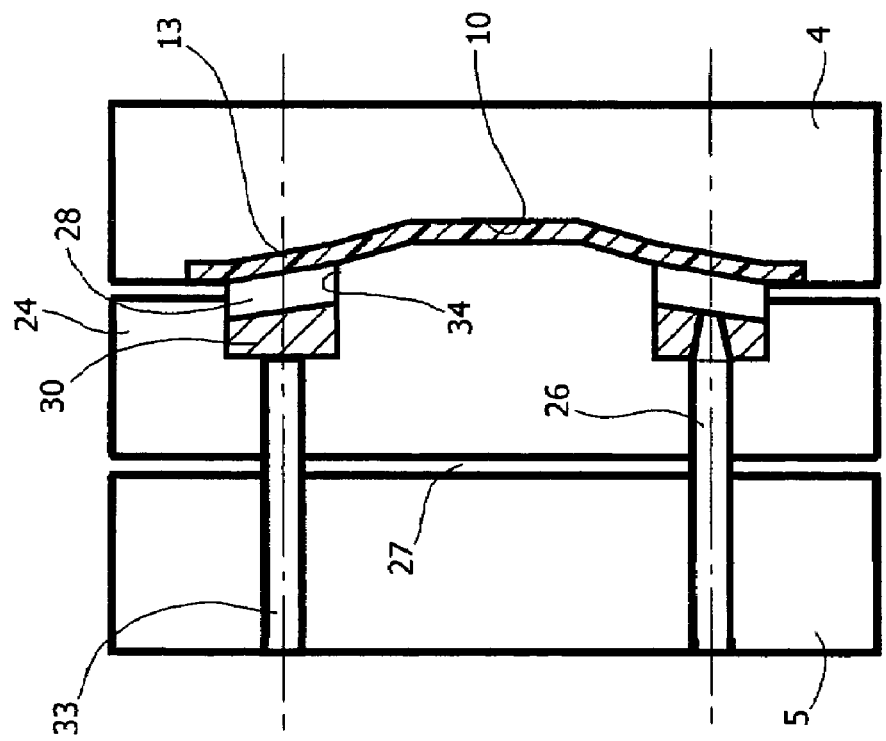
FIG. 10 is a view similar to that of FIG. 9 illustrating a second step.

As regards, in particular, the moulding of the second component of the bi-component article, i.e., with respect to the mould 11 and to the countermould 12, in which usually the edges of the parts to be moulded are more complex, and there can moreover be provided internal members, which are mobile with respect to the mould for the provision of fixing elements and the like of the bi-component article, the adoption of the system represented in FIGS. 9 and 10 can prove more convenient. In this case, the countermould consists of a mobile section 24 guided along horizontal columns 33, carried by the plate 5 and to which there is fixed an annular frame 30 housed slidably within a front annular seat 34 of the mobile section 24. The frame 30 delimits, in the front annular seat 34, a secondary cavity 28, and the mobile section 24 is displaceable with respect to the plate 5 by an amount designated by 27 upon closing against the mould 10, within which the first component 13 of the bi-component item has been previously formed by means of injection-compression. FIG. 9 represents the condition prior to injection-compression of the second component 14. Said material is to be injected through one or more nozzles 26 that traverse the frame 30 and are connected, in a usual way via a hot channel, to the injection assembly within the cavity A of the mould 10 containing the first component 13, whilst FIG. 10 shows the same arrangement as that of FIG. 9 following upon injection of the material of the second component 14. As a result of the closing obtained by advance of the plate 5, the distance 27 is cancelled out and the mobile section 24 is maintained in closing contact against the central element 4, exerting a pressure against the peripheral edge of the first component 13. The secondary cavity 28, within which the material of the second component 14 has been injected, is reduced so as to bring about compression of said material as a result of the relative motion between the mobile section 24 and the annular frame 30. In the same FIG. 10, the reference numbers 31 and 32 designate, respectively, the extraction assembly and the extraction stages for the bi-component article thus formed by means of double injection-compression.

Figure 11:
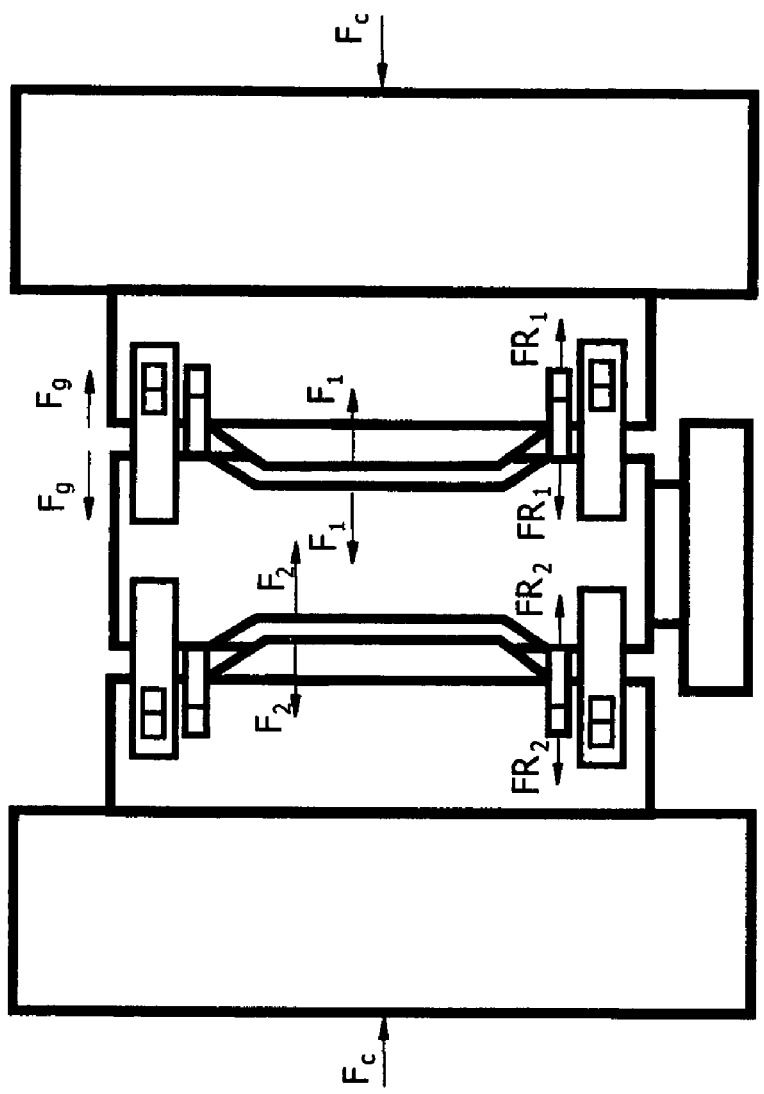
FIG. 11 is a view similar to that of FIG. 4 exemplifying the forces involved in the procedure of injection-compression moulding performed by the apparatus according to the invention.

FIG. 11 exemplifies the forces involved in the double-injection-compression moulding cycle performed by the apparatus according to the invention. In FIG. 11:

F1 is the force of thrust of the material of the first step during injection and compression;

F2 is the force of thrust of the material of the second step during injection and compression;

FR1 is the force of thrust of the frame of the first step to obtain closing of the cavity;

FR2 is the force of thrust of the frame of the second step to obtain closing of the cavity;

Fc is the closing force exerted by the press; and

Fg is the force exerted by the hooks.

The force Fc is exerted by the press. The press is able to control force and relative displacement of the surfaces so that it automatically maintains the balance of the system and hence of the assemblies connected to the fixed surface and to the mobile surface of the press.

Assuming F1>F2 and assuming that the contribution of the hooks of the second step is zero, we have for the fixed surface the condition of equilibrium:

$$Fc=F1+FR1-Fg$$

for the mobile surface the condition:

$$Fc=F2+FR2$$

and for the central half-moulds the condition:

$$F1+FR1-Fg=F2+FR2$$

From the foregoing relations we obtain the following:

$$F1-F2=FR2-FR1+Fg.$$

The force that the frames and the hooks must exert are functions of the difference of the two levels of thrust.

Maintenance of the conditions of equilibrium of the press can be assigned to the thrust of the seal frames and to the hooks, with forces that can even be relatively modest (depending upon the difference of thrust between the first and second components) and hence with hooks of not excessive dimensions. It should be recalled that the foregoing equations apply in the case where $F_1>F_2$.

The tendency will thus be for a minimum force $FR_1$ to be exerted, such as to guarantee hermetic closing of the cavity, and to increase appropriately the force $FR_2$ to compensate partially for the difference of the forces of thrust of the two steps, leaving only the remaining part to the hooks so as to prevent closing of the cavity of the second step under the thrust of the injection of the first.

The overall closing force that the press must exert will hence be practically the same as for the step with higher thrust (the "1" in this case) where it will be necessary to keep $FR_1$ down to the minimum indispensable. We thus obtain the force that the hooks must support:

$$Fg=F_1+FR_1-F_2-FR_2=F_1-F_2+FR_1-FR_2$$

The hooks support a force that is equal to the difference of the levels of thrust of the materials and is partially compensated by the levels of thrust that may be exerted on the frames to reduce said difference appropriately. It should be recalled that the moulding process is performed with an injection-compression system, where the forces of closing required are approximately one quarter of the ones used for traditional injection moulding. Therefore, the difference may be considered to be normally quite contained and may be balanced sufficiently by the forces that can be distributed on the frames.

Of course, the details of construction and the embodiments may vary widely with respect to what is described and illustrated herein, without thereby departing from the scope of the present invention, as defined by the ensuing claims.

The invention claimed is:

1. An apparatus for the moulding of articles made of plastic material with two components, comprising:

a rotating central element, which bears a first mould and a second mould set opposite to one another;

a first countermould and a second countermould, which are set on opposite sides with respect to the rotating central element and can be translated with respect thereto;

means for closing said first and second countermoulds with respect to said first and second moulds to define, respectively, a first cavity and a second cavity;

at least one hook member releasably connecting said central element to at least one projection of at least one of the first countermold and the second countermold;

means for injecting a plastic material within said first and second cavities for the formation of said first and second component, said at least one hook member comprising an opening receiving said at least one projection and allowing movement of said at least one projection to allow a stroke of a pre-set opening of at least one cavity of said first cavity and said second cavity prior to injection of the plastic material within said first and second cavities.

2. The apparatus according to claim 1, in which said first and second cavities define different thrust surfaces of the injected plastic material, wherein said retention means are operatively associated only to a cavity of said first and second cavities with a larger thrust surface.

3. The apparatus according to claim 1, wherein said retention means are operatively associated to both of said cavities.

4. The apparatus according to claim 1, wherein said opening stroke is adjustable.

5. The apparatus according to claim 1, wherein said opening stroke can be made different for said first and second cavities.

6. The apparatus according to claim 1, wherein each of said first and second cavities is operatively associated with a mobile outer perimetral frame to delimit in a sealed way the respective cavities during the step of injection of the plastic material.

7. The apparatus according to claim 6, wherein said perimetral frame is subjected to the action of thrust means tending to press it towards said rotating central element.

8. The apparatus according to claim 7, wherein said thrust means are fluid-driven actuators.

9. The apparatus according to claim 7, wherein said thrust means are springs.

10. The apparatus according to claim 7, wherein said thrust means are adjustable.

11. The apparatus according to claim 6, wherein said perimetral frame is housed slidably within a mobile section of the countermould and defines a secondary injection-compression cavity.

12. A method for injection-compression moulding of articles made of plastic material with two components, the method comprising:

providing an apparatus comprising:

a rotating central element, which bears a first mould and a second mould set opposite to one another; and a first countermould and a second countermould, which are set on opposite sides with respect to the rotating element and can be translated with respect thereto;

simultaneously closing said first and second countermoulds with respect to said first and second moulds to define, respectively, a first cavity and a second cavity;

at least one hook member releasably connecting the central element to at least one projection of at least one of the first countermold and the second countermold, the at least one hook member comprising an opening receiving the at least one projection and allowing movement of the at least one projection to allow a stroke of a pre-set opening of at least one cavity of the first cavity and the second cavity prior to an injection of a plastic material with in the first cavity and the second cavity;

injecting the plastic material within the first cavity and the second cavity; and applying to the first cavity and the second cavity a closing force for performing a compression of the moulded plastic material injected therein.

* * * * *